S. B. BUSHFIELD.

Treadles for Sewing-Machines.

No. 5,595. Reissued Oct. 14, 1873.

Witnesses:
F. L. Durand
C. L. Emert

Inventor.
Saml B. Bushfield.
per Alexander Mason
Attorneys.

AM. PHOTO-LITHOGRAPHIC Co. N.Y. (OSBORNE'S PROCESS)

UNITED STATES PATENT OFFICE.

SAMUEL B. BUSHFIELD, OF BALTIMORE, MARYLAND, ASSIGNOR, BY MESNE ASSIGNMENTS, TO HIMSELF, ROBERT D. MORRISON, JOHN H. WARNER, AND WILLIAM L. STORK.

IMPROVEMENT IN TREADLES FOR SEWING-MACHINES.

Specification forming part of Letters Patent No. 140,677, dated July 8, 1873; reissue No. 5,595, dated October 14, 1873; application filed September 23, 1873.

*To all whom it may concern:*

Be it known that I, SAMUEL B. BUSHFIELD, of Baltimore, in the county of Baltimore and in the State of Maryland, have invented certain new and useful Improvements in Attaching Treadles to Sewing-Machines; and do hereby declare that the following is a full, clear, and exact description thereof, reference being had to the accompanying drawings, and to the letters of reference marked thereon, making a part of this specification.

The nature of my invention consists in connecting the treadle of a sewing-machine with a stationary shaft, and with the pitman, by means of rubber or other elastic connections, as will be hereinafter more fully set forth.

Ordinarily the pitman is attached to the treadle, and the treadle to the supporting-shaft, by rigid bearings of construction suitable to admit of the rocking motion. This is objectionable, for the reason that these bearings require attention and frequent oiling, and in time wear loose, causing rattling, irregular motion, jarring, and noise, to obviate which is the object of my invention.

In order to enable others skilled in the art to which my invention appertains to make and use the same, I will now proceed to describe its construction and operation, referring to the annexed drawing, in which—

Figure 1:
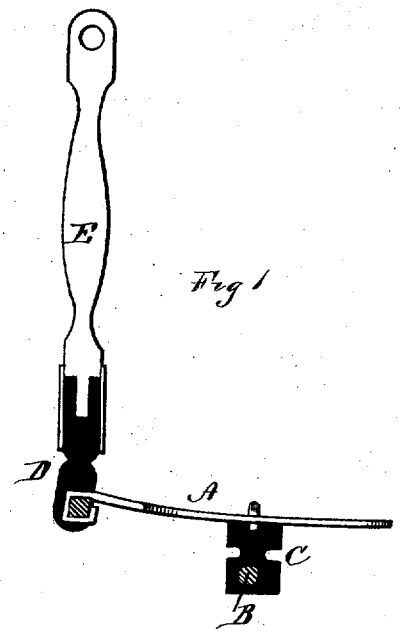
Figure 2:
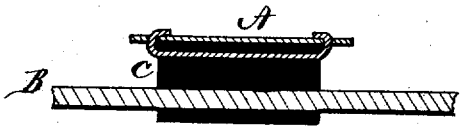
Figure 3:
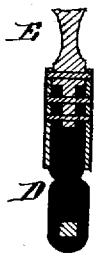

Figure 1 is a side view, and Figs. 2 and 3 sectional views, showing my invention.

A represents a treadle of any suitable construction, provided at its instep with a piece, C, of rubber or other elastic material, by which it is connected to the stationary shaft B. This elastic piece C being the sole support of the treadle, and forming the fulcrum upon which it oscillates, is pierced longitudinally with an angular hole, through which the shaft B is inserted, the angular form furnishing a simple and efficient mode of preventing the elastic piece C from turning on the shaft B. The pitman E is constructed with an elastic section, D, at or near the end which attaches to the treadle. This section D of rubber or other elastic material is firmly fastened in any suitable way to the rigid portion of the pitman E, and also to the treadle, and by reason of its flexibility or elasticity admitting of the vibrations of the pitman, thus dispensing with the ordinary ball or journal joint.

In either case there are no metal or other rigid substances bearing and rubbing against each other, and there can therefore be no rattling, jarring, or noise, and the necessity of oiling is entirely avoided.

Having thus fully described my invention, what I claim, and desire to secure by Letters Patent, is—

1. The elastic piece C rigidly attached to the shaft forming the support and fulcrum for the treadle A, substantially as and for the purpose set forth.

2. The combination of a treadle with the pitman E, having an elastic section, D, at or near its point of articulation to the treadle, in the manner and for the purpose substantially as specified.

3. The combination of the treadle A, elastic piece C, shaft B, and pitman E having an elastic section, D, all constructed to operate in the manner and for the purpose substantially as specified.

SAMUEL B. BUSHFIELD.

Witnesses:

GEO. MCCAFFRAY,

JNO. N. MCLEAN.